United States Patent
Strein et al.

(10) Patent No.: US 9,351,030 B2
(45) Date of Patent: May 24, 2016

(54) AUTOMATIC CREATION OF FRAME ACCURATE PROGRAM/COMMERCIAL TRIGGERS FOR LIVE/AUTOMATED TELEVISION PROGRAMS

(71) Applicant: Disney Enterprises, Inc., Burbank, CA (US)

(72) Inventors: Michael J. Strein, Oakdale, NY (US); Steven Machanic, Dumont, NJ (US); Kenneth J. Michel, Brightwaters, NY (US); Anil Abraham, Nutley, NJ (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 13/955,349

(22) Filed: Jul. 31, 2013

(65) Prior Publication Data

US 2014/0259051 A1    Sep. 11, 2014

Related U.S. Application Data

(60) Provisional application No. 61/772,795, filed on Mar. 5, 2013.

(51) Int. Cl.
| | | |
|---|---|---|
| *H04N 7/10* | (2006.01) | |
| *H04N 7/025* | (2006.01) | |
| *H04N 21/43* | (2011.01) | |
| *H04N 21/234* | (2011.01) | |
| *H04N 21/488* | (2011.01) | |
| *H04N 21/8545* | (2011.01) | |
| *H04N 21/2668* | (2011.01) | |
| *H04N 21/81* | (2011.01) | |
| *H04N 21/236* | (2011.01) | |
| *H04N 5/272* | (2006.01) | |
| *H04N 21/433* | (2011.01) | |

(52) U.S. Cl.
CPC ..... *H04N 21/4305* (2013.01); *H04N 21/23424* (2013.01); *H04N 21/4882* (2013.01); *H04N 21/8545* (2013.01); *H04N 5/272* (2013.01); *H04N 5/2723* (2013.01); *H04N 21/236* (2013.01); *H04N 21/2668* (2013.01); *H04N 21/4331* (2013.01); *H04N 21/812* (2013.01)

(58) Field of Classification Search
CPC ............... H04N 5/272; H04N 5/2721; H04N 21/23424; H04N 21/236; H04N 21/2668; H04N 21/4331; H04N 21/812
See application file for complete search history.

(56) References Cited

U.S. PATENT DOCUMENTS

2009/0070837 A1* 3/2009 Jacobs ........................ 725/104
2011/0314493 A1* 12/2011 Lemire et al. .................. 725/32

OTHER PUBLICATIONS

MasterPlay, "Workflow Automation for Broadcast & Cable", 2012.*

* cited by examiner

*Primary Examiner* — Nathan Flynn
*Assistant Examiner* — James R Marandi
(74) *Attorney, Agent, or Firm* — Patterson + Sheridan, LLP

(57) ABSTRACT

Systems, methods and computer program products to insert frame accurate triggers in media programs, by receiving indication that a first tally, of a plurality of tallies, is active, the first tally corresponding to a media program, identifying a type of the first tally, generating a trigger based on the type of the first tally, and inserting a message in the media program responsive to the trigger.

24 Claims, 6 Drawing Sheets

| Item | A<br>A/V Production System Tally 410 | B<br>Automation Control System Event 415 | C<br>Automation Control System Backup Event 420 | D<br>Switcher Tally 425 | E<br>Assignment Logic 430 | Combinatorial Logic 435 | GPO Output Tally-Start of CML 440 | GPO Output Tally-Rejoin PGM 445 |
|---|---|---|---|---|---|---|---|---|
| 401 | Auto | Start of CML | Start of CML | N/A | N/A | A+(B or C) | On (Active Low-4 seconds) | Off |
| 402 | Auto | Rejoin PGM | Rejoin PGM | N/A | N/A | A+(B or C) | Off | On (Active Low-4 seconds) |
| 403 | Manual | N/A | N/A | Input 1 | CML | (A+D+E) | On (Active Low-4 seconds) | Off |
| 404 | Manual | N/A | N/A | Input 2 | PGM | (A+D+E) | Off | On (Active Low-4 seconds) |
| ... | ... | ... | ... | ... | ... | ... | ... | ... |
| 405 | Manual | N/A | N/A | Input N | PAS | (A+D+E) | Condition passes | Condition passes |

| TRIGGER APPLICATION 512 | | |
|---|---|---|
| COMBINATORIAL LOGIC 601 | ASSIGNMENT LOGIC 602 | MESSAGE INSERTER 603 |

FIG. 6

AUTOMATIC CREATION OF FRAME ACCURATE PROGRAM/COMMERCIAL TRIGGERS FOR LIVE/AUTOMATED TELEVISION PROGRAMS

CROSS-REFERENCE TO RELATED APPLICATIONS

This application claims benefit of U.S. provisional patent application Ser. No. 61/772,795, filed 5 Mar. 2013, which is herein incorporated by reference in its entirety.

BACKGROUND

1. Field of the Invention

Embodiments disclosed herein relate to the field of audio/video distribution. More specifically, embodiments disclosed herein relate to creating frame accurate program and commercial triggers for audio/video programs.

2. Description of the Related Art

Traditionally, triggers indicating the start of programming content and commercial content in television feeds are manually created. Recent advances have enabled content providers to automatically create triggers for pre-recorded (or automated) television shows and programs. A trigger indicates the start of the programming content or commercial content. However, inserting triggers in a live television distribution relies on a manual process where a person creates each trigger at an appropriate point in a broadcast. The resulting triggers are not frame-accurate, resulting in artifacts known as "upcuts," "downcuts," segments of black or other unwanted audio/video in an otherwise seamless television program.

SUMMARY

Embodiments disclosed herein provide a system, method, and computer program product to insert frame accurate triggers in media broadcasts, by receiving indication that a first tally, of a plurality of tallies, is active, the first tally corresponding to a media broadcast, identifying a type of the first tally, generating a trigger based on the type of the first tally, and inserting a message in the media broadcast responsive to the trigger.

BRIEF DESCRIPTION OF THE DRAWINGS

So that the manner in which the above recited aspects are attained and can be understood in detail, a more particular description of embodiments of the disclosure, briefly summarized above, may be had by reference to the appended drawings.

It is to be noted, however, that the appended drawings illustrate only typical embodiments of this disclosure and are therefore not to be considered limiting of its scope, for the disclosure may admit to other equally effective embodiments.

FIG. 4 illustrates configuration data for automatic creation of frame accurate program and commercial triggers for live and automated television programs, according to one embodiment.

FIG. 6 illustrates components of a trigger application, according to one embodiment.

DETAILED DESCRIPTION

When a content provider wishes to air a commercial message (which may include, but is not limited to an advertisement, a promotion, or any other interstitial material) at a downstream entity (such as a local affiliate, cable/satellite provider, internet streaming services, etc), the provider communicates a commercial trigger such that distribution of the programming portion creates an available section for inserting the commercial in the broadcast. Likewise, when commercials have finished, a program trigger needs to be communicated to allow the live broadcast to resume distribution. As used herein, a broadcast may refer to any method of distributing audio or video content, such as satellite, cable, internet, etc.

Embodiments disclosed herein implement a combination of assignment panel, automation GPIO's (General Purpose Inputs/Outputs, typically a high or low closure giving an indication of a change of state), production GPIO's, and combinational logic to create program and commercial triggers for a media program. These triggers may result in inserting messages in the media program. Examples of messages include standard Society of Cable Television Engineers (SCTE), messages. SCTE message insertion is a standard type of in-band messaging system used for baseband audio/video streams. Although SCTE messages as a reference example herein, embodiments of the disclosure contemplate any standard messaging system. Such triggers are then used by television stations, Multiple System Operators (MSO's, where many television feeds may be managed at once), video on demand (VOD) providers, and internet streaming services to identify when to insert advertising (or other messages) in the broadcast. That is, the triggers are used to replace or substitute commercials or programs in the media program. Embodiments disclosed herein allow television networks, stations, or any entity sourcing video to automate the process of creating program and commercial triggers and do it in a frame accurate manner.

Figure 1:
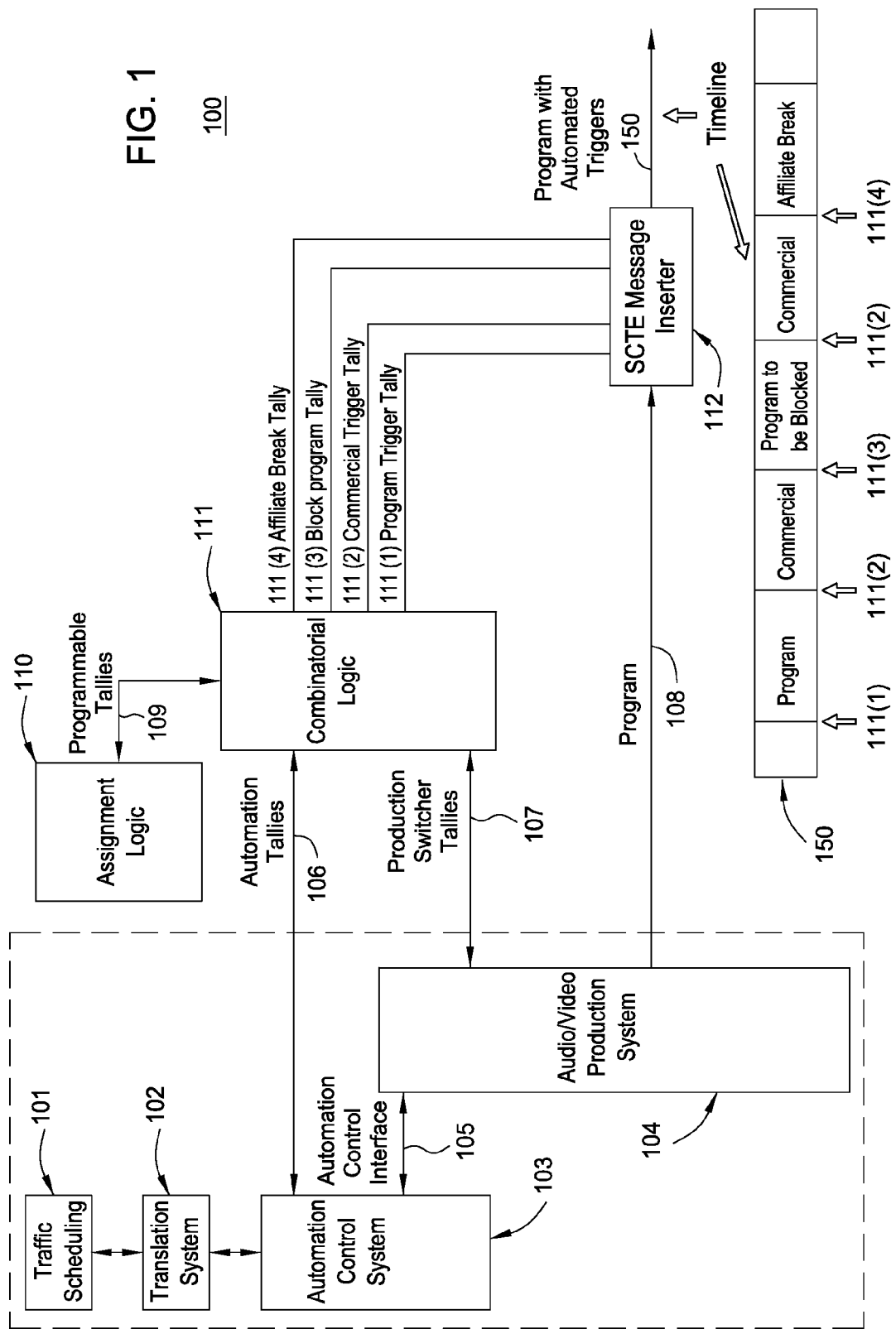
FIG. 1 illustrates a system for creating frame accurate program and commercial triggers for live and automated television programs, according to one embodiment.

FIG. 1 is a block diagram 100 illustrating a system for automatic creation of frame accurate program and commercial triggers for live and automated television programs, according to one embodiment disclosed herein. As shown, the system includes a traffic/scheduling system 101, where commercials are sold for a given period of time, such as a day. The traffic scheduling system 101 is a schedule of events for the day, e.g., programs, commercials, promotional spots and PSAs (public service announcements). Operators may modify the list as events may change throughout the day. A translation system 102 receives sales/scheduling data from the traffic/scheduling system 101 and generates a run list. The run list details an automation of programs that are scheduled to run during the day. The run list is sent to the automation control system 103. The automation control system can then automatically play pre-recorded programs, commercials and promos defined in the run list. In some embodiments, the traffic/scheduling system 101 may connect directly to the automation control system 103, bypassing the translation system 102. The automation control system 103 may also be used to start, stop and execute specific tasks based on lists and is referenced to a real time clock synchronized across multiple systems.

The audio/video production system 104 is used in conjunction with the automation control system 103 for playback of automated events and handling live television shows, where start and end times for commercial breaks are typically not known and subject to change. The audio/video production system 104 may also be used to create, combine, modify and replace all aspects of the typical linear television program stream. The audio/video production system 104 may include production equipment that controls transitions between program/commercial inputs, insertion and overlay of graphical elements, addition/manipulation of audio elements as well as a host of other items that may affect the audio/video components of the television stream. An example of audio/video production system equipment is a production switcher. Personnel working with the audio/video production system 104 may run extra commercials or use a trigger to start a commercial at a specific time. The automation control system 103 and audio/video production system 104 are communicably coupled using an automation control interface 105.

Combinatorial logic 111 is configured to receive tallies (a specific example of a GPIO), which are closures traditionally used for such actions as illuminating a light on a monitor in a control room, to indicate which source is present on the monitor. The combinatorial logic 111 includes programmable output responses that may be generated from a number and series of inputs. The combinatorial logic 111 creates these responses using logic techniques such as Boolean algebra, truth tables, and Karnaugh maps. More specifically, the combinatorial logic 111 receives automation tallies 106 from the automation control system and production switcher tallies 107 from the audio/video production system. The automation control system 103 automatically provides the automation tallies 106, while production switcher tallies 107 may be initiated by a user, depending on whether the production switcher is under automation control or user control. The combinatorial logic 111 may reference an assignment logic 110 when receiving a tally. The assignment logic 110 defines an assignment type for the various tallies and what should be done with the tallies when they are received from each source. The assignment logic 110 may mimic the audio/video production system 104, and communicate with the combinatorial logic 111 what type of input it receives. For example, the assignment logic 110 may indicate that the input is a program tally, a commercial tally, a block tally, or an ignore tally. The program tally is used to identify programming, e.g., to identify the television show or program being distributed. A commercial tally indicates that a source contains commercial advertisements or promos. An ignore tally indicates that no action should be taken, possibly because the content being distributed has already been augmented to include triggers and is being re-distributed.

The combinatorial logic 111 generates a plurality of triggers to include in the program stream 108 being distributed by the audio/video production system 101. Examples of the triggers include program trigger tallies 111(1), commercial trigger tallies 111(2), block program tallies 111(3), and affiliate break tallies 111(4). A program trigger tally 111(1) indicates that the current frame is the first frame of the program being distributed. A commercial trigger tally 111(2) indicates that the current frame is the first frame of a commercial segment. A block program tally 111(3) indicates that the current frame is the first of a set of frames that should not be distributed, e.g., due to a lack of rights to distribute (or receive, for a recipient) the frames. An affiliate break tally 111(4) indicates that an affiliate, such as a local television station, or a web provider, that they can begin distributing their own programs or commercials.

The audio/video production system 104 may have a number of audio/video feeds as sources. For example, source 1 may be a live television source, source 2 may be a commercial source, source 3 may be an automation source (i.e., a source under control of the automation control system 103), and source 4 may be a delay source. When source 1 is selected (or active), the audio/video production system 104 may generate a production switcher tally 107 and the combinatorial logic 111 issues a program trigger tally 111(1). When source 2 is selected, the combinatorial logic 111 may issue a commercial trigger tally 111(2). When source 3 is selected, the combinatorial logic 111 communicates with the automation control system 103 to determine what type of source it is (commercial or program), as this source has already been automated. When source 4 is selected, the combinatorial logic 111 ignores the source as it already includes triggers and is being re-distributed. The combinatorial logic 111 will maintain the states of all the tallies, and be intelligent enough to recognize sequences of sources that are similar. For example, switching from a commercial source to another commercial source in the audio/video production system 104 would not cause a subsequent commercial trigger tally 111(2) unless desired.

The SCTE message inserter 112 receives the trigger tallies from the combinatorial logic 111 and inserts automated triggers into the audio/video content of the program 108. Doing so generates a program with automated triggers 150. In one embodiment, the automated triggers are inserted as SCTE-104 standard messages as general purpose input (GPIs). A general purpose input may be a closure which may be high or low. The SCTE message inserter 112 adds the appropriate tag to the video stream.

As shown, the program with automated triggers 150 has been injected with five different triggers. A first program trigger tally 111(1) is used to indicate the beginning of a program. A first commercial trigger tally 111(2) indicates a first block of commercials. A block program tally 111(3) indicates a portion of the program (or a different program) to be blocked. A second commercial trigger tally 111(2) indicates a second block of commercials. An affiliate break tally 111(4) indicates an affiliate break, where an affiliate, or other downstream entity, may air their own programming, commercials, or promotions.

Figure 2:
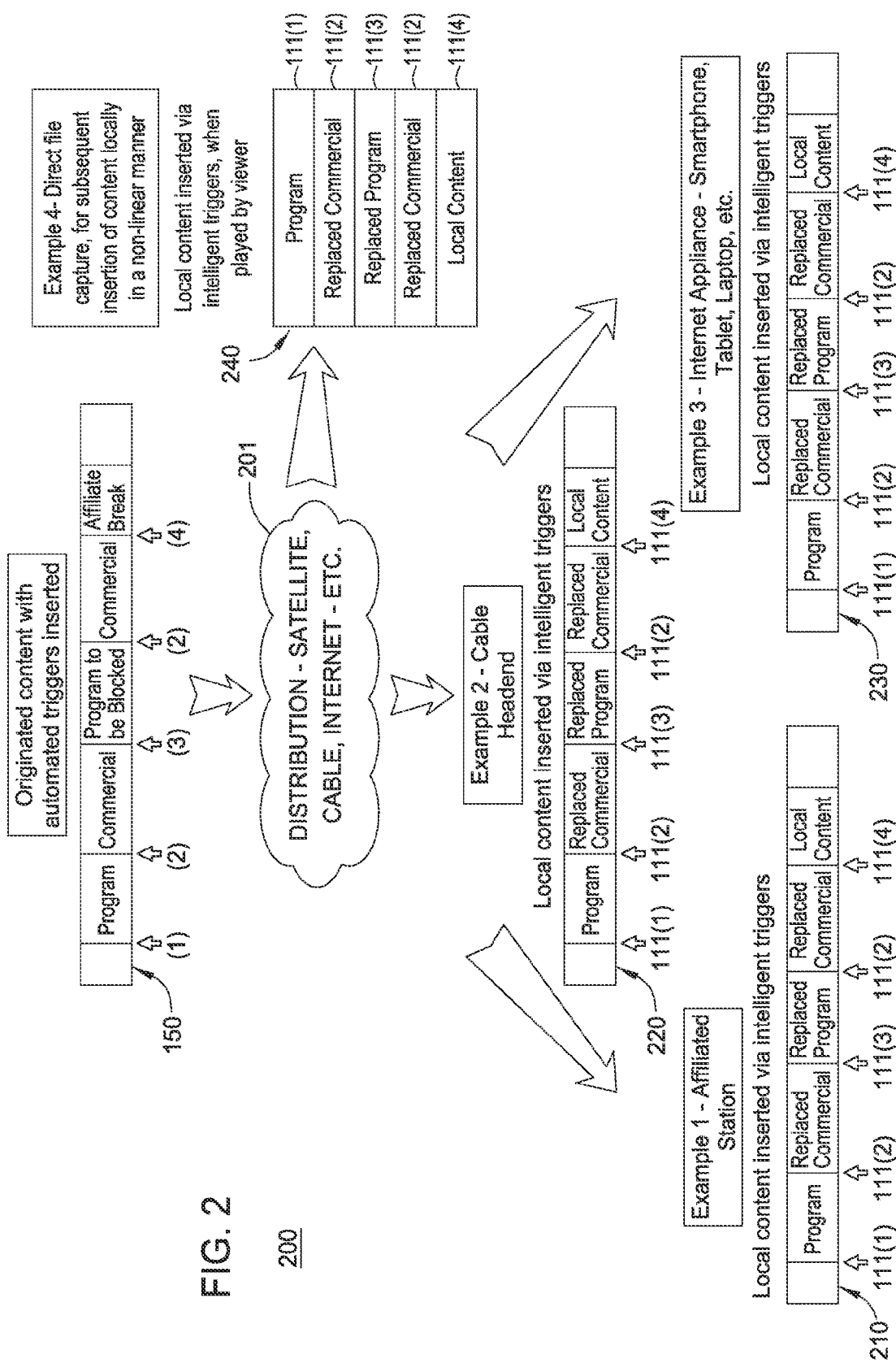
FIG. 2 illustrates use scenarios for downstream entities receiving television programs having commercial triggers, according to one embodiment.

FIG. 2 is a block diagram 200 illustrating implementation scenarios of a system for automatic creation of frame accurate program and commercial triggers for live and automated television programs, according to one embodiment disclosed herein. Generally, FIG. 2 depicts different applications of distributing the program with automated triggers 150. The program with automated triggers 150 may be distributed through a distribution network 201 such as a broadcast or satellite network, a cable network, or the internet. In example 1, the program audio/video with automated triggers 150 has been distributed to an affiliated television station, which modifies program with automated triggers 150 to update audio/video stream 210 to include additional material. Likewise, in examples 2 and 3, a cable provider and internet television provider are shown to have modified the program with automated triggers 150 to create updated audio/video streams 220 and 230, respectively. Additionally, the program with automated triggers 150 may be saved to a file 240 which includes the audio/video file segments along with the associated triggers, as shown in example 4. This file may be available for downstream entities, i.e., a video on demand (VOD) content provider, to insert their own replacement commercials and/or programs. The triggers indentify the replaceable segments, which may be replaced in non real-time and nonlinearly. Optionally, the triggers may be translated to essence markers, or some other file-based method of indentifying content to be replaced.

As shown, the updated audio/video streams 210, 220, and 230 each include the unmodified triggers 111(1-4) inserted by the SCTE message inserter 112 into the program with automated triggers 150. The triggers may be inserted at the first frame coincident with the triggers 111(1-4) of the audio/video streams, allowing each audio/video stream to be modified seamlessly, resulting in a program stream without any artifacts such as upcuts, which may result from inaccurate switching. However, each recipient may modify the actual content distributed at each of these trigger points differently. For example, updated audio/video stream 210 now has a program at trigger point 111(1), a replaced commercial at trigger point 111(2), a replaced program at trigger point 111(3), a replaced commercial at trigger point 111(2), and has added local content at trigger point 111(4). Likewise, updated audio/video stream 220 now has a program at trigger point 111(1), a replaced commercial at trigger point 111(2), a replaced program at trigger point 111(3), a replaced commercial at trigger point 111(2), and has added local content at trigger point 111(4). Updated audio/video stream 230 now has a program at trigger point 111(1), a replaced commercial at trigger point 111(2), a replaced program at trigger point 111(3), a replaced commercial at trigger point 111(2), and has added local content at trigger point 111(4). Updated audio/video file 240 include the unmodified triggers 111(1-4) inserted by the SCTE message inserter 112 into the program with automated triggers 150. As noted, the downstream entity, such as the VOD provider, may insert replacement commercials at trigger points 111(2), and replacement content at trigger point 111(3) and 111(4) (which may be local content, if applicable).

Each replaced program, commercial, and local content can be different across each updated audio/video stream 210, 220, and 230, and file 240, even though each was derived from program with automated triggers 150. For example, each recipient may replace the commercials with different advertising messages, while the replaced program remains unchanged. Once the stream is assembled, the triggers may be removed or maintained by the downstream entity depending on whether the stream still passes through subsequent entities.

Figure 3:
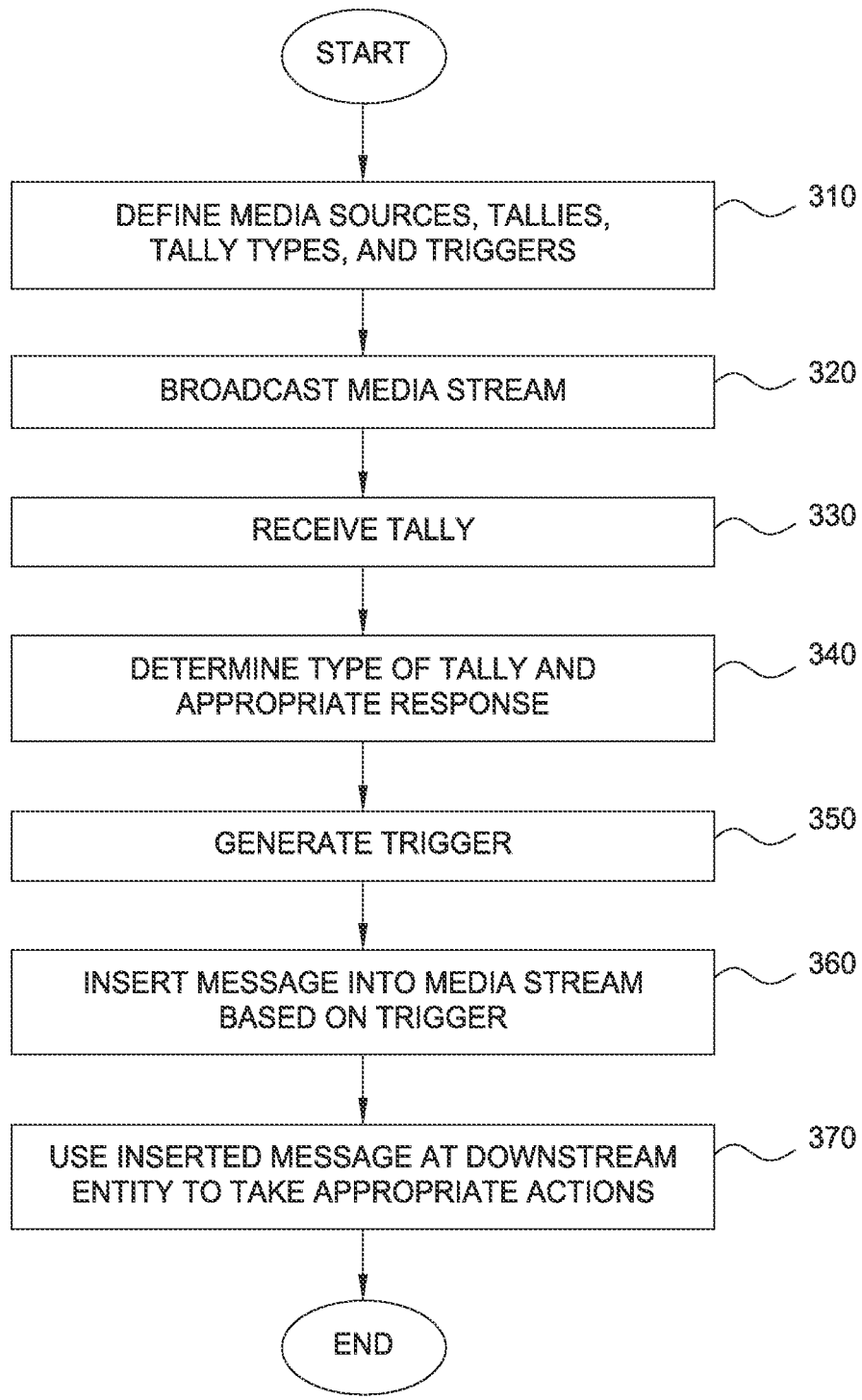
FIG. 3 illustrates a method for creating frame accurate program and commercial triggers in a television program, according to one embodiment.

FIG. 3 is a flow chart illustrating a method 300 for automatic creation of frame accurate program and commercial triggers for live and automated television programs, according to one embodiment disclosed herein. Generally, the system automatically inserts triggers in a media program that may be used by downstream entities to perform any number of predefined operations, including but not limited to inserting a commercial or local content in the media program, or restricting the local broadcast of one or more frames of the media program. For example, consider a live football game broadcast by a national media provider. A first trigger inserted into the media program may indicate the start of a commercial. When a downstream entity, e.g., a local affiliate, broadcasting the football game encounters the first trigger, the local affiliate inserts a commercial in the local broadcast. The media program may be a live broadcast, a prerecorded program, or a video-on-demand (VOD) program. The media program may include audio data, video data, or both. The media program may be distributed using cable/satellite broadcasts, the Internet, and VOD services.

At step 310, a user defines media sources, input tallies, output tallies, and triggers. Alternatively, configuration information may be retrieved from a storage location, or predefined in the software. Generally, at step 310, all necessary configuration information is defined. This step ensures that the assignment logic, combinatorial logic and all the required tallies shown in FIG. 1 have been defined and configured correctly. The configuration information may include information related to each of a number of media sources, a number of general purpose input (GPI) tallies, and a number of general purpose output (GPO) tallies. FIG. 4 provides more detailed example of the configuration information. At step 320, a broadcaster may broadcast a media program. For example, the broadcaster may broadcast a live football game to affiliates. At step 330, the combinatorial logic 111 receives a tally. The tally received may indicate that the closure on one of a plurality of GPIs has come in high after being low for a period of time. The automation control system (ACS) 103 may send automated tallies to the combinatorial logic 111, and the audio/video production system 104 may transmit production switcher tallies 107. The production switcher tallies may be initiated by a human user, and sent to the combinatorial logic 111.

At step 340, the system determines a type of tally identified at step 330 and an appropriate response. For example, the system may determine that the tally is a production switcher tally (i.e., user initiated and therefore not automated) and that the tally has been predefined to be a "start commercial" tally. The system may also reference logic to determine an appropriate response to the tally, such as which GPO to turn on or off. The logic may specify that the start commercial tally requires that a first GPO should be turned on.

At step 350, the system generates a trigger according to the appropriate response defined in the logic. The trigger may be the turning on or off of a specific GPO, which when received, causes the SCTE message inserter 112 to insert a predefined message in the vertical ancillary data space (VANC) of the media program. At step 360, the SCTE message inserter 112 inserts the message in the media program. For example, if the trigger indicates that a commercial break has started, a message representing the beginning of a commercial break is inserted into the media program. At step 370, a downstream entity may use the inserted message to take appropriate actions. For example, when receiving a message for the commercial break during a live football game, the local broadcaster may select a commercial to insert in the local broadcast stream.

Many breaks may occur during a live broadcast, each of which is represented by a tally. As a result, the system may repeat steps 330-360 of the method 300 for each received tally to insert the appropriate triggers and messages into the media program. Because the triggers are frame accurate, downstream entities may seamlessly switch from live content to national or local commercials and content. Responsive to receiving a new tally, the system may repeat the steps of the method 300 multiple times during a media broadcast.

FIG. 4 illustrates example configuration data 400 for automatic creation of frame accurate program and commercial triggers for live and automated television programs, according to one embodiment. As shown, configuration data 400 includes a plurality of rows 401-405 corresponding to a GPI tally. For each tally 401-405, the configuration data 400 specifies an A/V production system status tally 410, an automation control system event 415, an automation control system backup event 420, a switcher tally 425, an assignment logic 430, a combinatorial logic 435, and GPO output tallies 440 and 445. The A/V production system status tally 410 specifies whether the audio/video production system is in automation or manual mode and hence whether the tally originated from an automated source such as the automation control system (ACS), or from a manual source (from a user interacting with the A/V production system). For example, tallies 401 and 402 are "auto" tallies, or automation tallies originating from the ACS. However, tallies 403-405 are "manual" tallies, indicating that they are production switcher tallies that "come high" when a user presses a button on the A/V production system. An automation control system event 415 specifies a type of tally for the automation tallies received from the ACS. Therefore, as shown, automation tally 401 defines a "Start of CML," which indicates the start of a commercial pod, which may include a set of commercials, advertisements, promotions, or other interstitial material. As shown, automation tally 402 defines as a "rejoin program" tally, which indicates that the media content, such as a movie, television show, or sporting event is resuming from commercial break. AN production system tallies 410 have not been defined for tallies 403-405, as they are manual, not automation tallies. An automation control system backup event 420 specifies a type of tally coming from a standby (or backup) automation control system. The tallies for ACS backup event 420 are identical to ACS event 415 tallies, as the former system is a backup to the latter system.

The switcher tally 425 defines a source of the manual tallies 403-405. As shown, tally 403 originates from input 1, while tally 404 originates from input 2, and tally 405 originates from input N. Any number of inputs may be defined. The assignment logic 430 specifies a type of the manual tallies 403-405, i.e., a source type for any given input. As shown, input 1, is a commercial source, input 2, is a program source, and input N is a pass source, which is a placeholder for an ignore source.

A combinatorial logic 435 determines, for each GPI tally, an appropriate output response upon determining that the electrical signal of the GPI tally has come in high. For example, when commercial GPI tally 403 for input 1 comes in high, the combinatorial logic 435 specifies logic of (A+D+E), indicating that columns 410, 425, and 430 should be ANDed together. Applying the logic allows the system to output tallies 440 and 445. The GPO output tally 440 defines a start of a commercial trigger when turned on. Therefore, in row 403, the output of GPO output tally 440 is on, as the input 1 is defined as a commercial source in assignment logic 430. After receiving the input tally 403, the system may turn on GPO output tally 440, which is equivalent to a trigger indicating that a commercial source is active. In response, the system may insert a message in the media program indicating that a commercial may be inserted at that point. Again, as the trigger messages are coincident with the first frame of audio/video, the subsequent program stream with replaced content should be seamless. Also as shown in row 403, GPO output tally 445 is off when the input tally 403 is received. GPO output tally 445 is defined as a "rejoin program" output tally, indicating that the commercial break (or other break) is over, and that the program (live or otherwise) is resuming. GPO output tally 445 is turned on when the combinatorial logic 435 for an input tally, such as input tally 404, specifies that a program source is being broadcast. Therefore, in turning on GPO output tally 445, a rejoin program trigger instructs the system to insert a message indicating that the program is resuming.

Generally, any number and type of output tallies, or triggers, may be defined. For example, a block program output tally may be included, which may be used to define a trigger causing the system to insert a message indicating that the subsequent frames of the program should be blocked (not broadcast) by certain providers, such as local affiliates or VOD providers. An affiliate break output tally may trigger the insertion of a message indicating that a local affiliate break may begin. These block program events and local affiliate break events are quite often automated events, meaning that they would originate from the automation control system column 415 and be enabled by the A/V production system status column 410.

Figure 5:
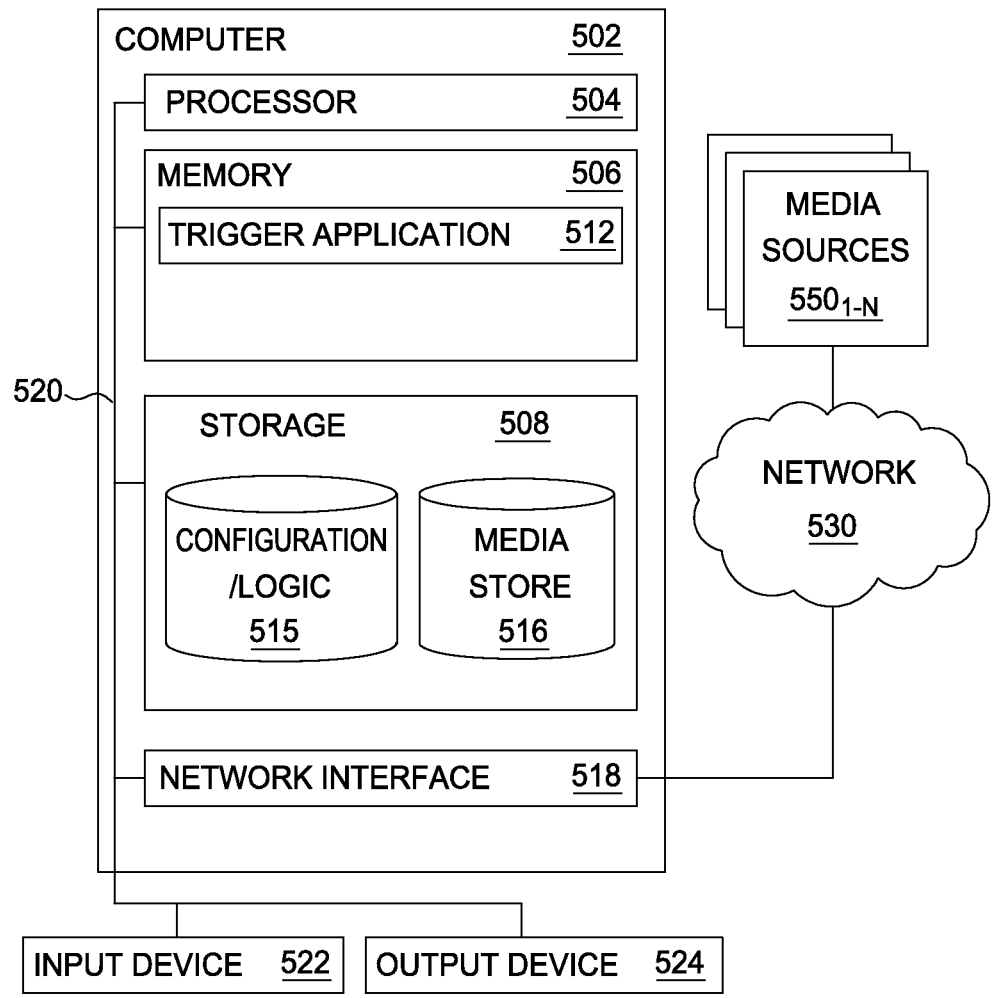
FIG. 5 illustrates a system for automatic creation of frame accurate program and commercial triggers for live and automated television programs, according to one embodiment.

FIG. 5 illustrates a system 500 for automatic creation of frame accurate program and commercial triggers for live and automated television programs, according to one embodiment disclosed herein. The networked system 500 includes a computer 502. The computer 502 may also be connected to other computers via a network 530. As shown, the computer 502 is connected to a plurality of media sources $550_{1-N}$, each of which may send one or more media programs to the computer 502. For example, a media source $550_1$ may stream a live basketball game while media source $550_2$ may stream a football game. In general, the network 130 may be a telecommunications network and/or a wide area network (WAN). In a particular embodiment, the network 530 is the Internet.

The computer 502 generally includes a processor 504 connected via a bus 520 to a memory 506, a network interface device 518, a storage 508, an input device 522, and an output device 524. The computer 502 is generally under the control of an operating system (not shown). Examples of operating systems include the UNIX operating system, versions of the Microsoft Windows operating system, and distributions of the Linux operating system. (The processor 504 is included to be representative of a single CPU, multiple CPUs, a single CPU having multiple processing cores, and the like. The network interface device 518 may be any type of network communications device allowing the computer 502 to communicate with other computers via the network 530.

The storage 508 may be a persistent storage device. Although the storage 508 is shown as a single unit, the storage 508 may be a combination of fixed and/or removable storage devices, such as fixed disc drives, solid state drives, SAN storage, NAS storage, removable memory cards or optical storage. The memory 506 and the storage 508 may be part of one virtual address space spanning multiple primary and secondary storage devices.

The input device 522 may be any device for providing input to the computer 502. For example, a keyboard and/or a mouse may be used. The output device 524 may be any device for providing output to a user of the computer 502. For example, the output device 524 may be any conventional display screen or set of speakers. Although shown separately from the input device 522, the output device 524 and input device 522 may be combined. For example, a display screen with an integrated touch-screen may be used.

As shown, the memory 506 contains a trigger application 512, which is an application generally configured to insert frame accurate triggers in media programs, such as live or automated television programs. Generally, the trigger application 512 is configured to receive an input tally from one or more of the media sources $550_{1-N}$, and reference the configuration/logic 515 to determine a type of the input tally and an appropriate response. Upon determining the appropriate response, the trigger application 512 may issue a trigger, which causes a component of the trigger application to insert a message in the VANC of the media program. The message may be used by downstream entities to perform predefined actions, such as inserting commercials or local content. The media programs with inserted messages may be saved in the media store 516, or sent to the downstream entities.

As shown, the storage 508 contains a configuration/logic 515, which includes data and logic implementing the trigger application 512. The configuration/logic 515 may include, but is not limited to, input and output tally definitions, source definitions, and logic implemented in Boolean algebra, truth tables, and Karnaugh maps. The storage 508 also includes a media store 516, which may be used to store media programs that have been modified by the trigger application 512 to include various messages.

FIG. 6 illustrates components 600 of the trigger application 512, according to one embodiment disclosed herein. As shown, the trigger application 512 includes a combinatorial logic 601, which is a component generally configured to receive input tallies from a plurality of media sources and generate an appropriate output response, or trigger, based on logic and other data stored in the configuration/logic 515, such as Boolean algebra, truth tables, and Karnaugh maps. The combinatorial logic 601, in creating an appropriate output response to an input tally, references the assignment logic 602, which is a component used to define assignment types to the input tallies received from automation control systems, a/v production systems, and programmable tallies. The combinatorial logic 601 may use the assignment type to create the appropriate output response. The message inserter 603 is generally configured to insert a message into the VANC space of a media program in response to receiving a trigger from the combinatorial logic 601. In one embodiment, such messages are Society of Cable Television Engineers (SCTE) messages.

Embodiments disclosed herein provide frame accurate replacement of commercial, program or any interstitial element in downstream devices in live or automated programs, resulting in a seamless program to the eventual viewer. Advantageously, the frame accurate program and commercial triggers described herein may be automatically applied to live television, without the need for human intervention.

Reference has been made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications such as the trigger application or related data available in the cloud. For example, the trigger application could execute on a computing system in the cloud and insert frame accurate triggers in to live and automated media broadcasts. In such a case, the trigger application could insert the triggers in the media program and store the media program at a storage location in the cloud. Doing so allows a user to access this information from any computing system attached to a network connected to the cloud (e.g., the Internet).

What is claimed is:

1. A method to insert frame accurate triggers in media broadcasts, comprising:
    defining a set of attributes for each of a plurality of tallies, wherein the set of attributes comprise: (i) a tally type, (ii) a source type, and (iii) an output type, wherein the tally type comprises one of an automated tally and a manual tally, wherein the manual tallies are initiated by a user and generated by a production switcher, wherein the automated tallies are generated by an automated control system and without requiring user input, wherein the set of attributes for manual tallies further comprise an input source;
    receiving an indication that a first tally, of the plurality of tallies, is active, the first tally corresponding to a frame of a media broadcast;
    upon determining that the tally type of the first tally comprises the manual tally:
        identifying the input source and the source type of the first tally; and
        generating an output tally based on the input source and the source type of the first tally;
    upon determining that the tally type of the first tally comprises the automated tally:
        identifying the source type of the first tally; and
        generating the output tally based on the source type of the first tally; and
    inserting a message in the media broadcast responsive to the output tally, wherein the message and the output tally indicate the source type of the first tally, wherein the message is inserted coincident with the frame of the media broadcast.

2. The method of claim 1, wherein the source type of the manual tallies is determined by referencing an assignment logic specifying a respective source type of the active input source, wherein the source type comprises one of: (i) a media program source, (ii) a commercial source, (iii) an automation source, and (iv) a pass source.

3. The method of claim 2, wherein output tally comprises one of: (i) a program source output tally, (ii) a commercial source output tally, (iii) an affiliate break source output tally, and (iv) a block program source output tally.

4. The method of claim 3, further comprising:
    responsive to receiving the media broadcast with the inserted message, performing a predefined operation based on the inserted message.

5. The method of claim 4, wherein the predefined operation is performed by a downstream entity, the downstream entity comprises each individual entity selected from: (i) a local affiliate, (ii) a video on demand (VOD) provider, (iii) a multiple system operator (MSO), (iv) a cable provider, (v) a satellite provider, and (vi) an internet streaming service.

6. The method of claim 5, wherein the downstream entity is configured to perform, in respective instances, each predefined operation selected from: (i) inserting an advertisement in a next frame of the media broadcast, (ii) resuming broadcasting of the media broadcast in the next frame of the media broadcast, and (iii) restricting broadcast of a set of frames of the media broadcast beginning with the next frame of the media broadcast.

7. The method of claim 1, wherein the media broadcast is a live broadcast.

8. The method of claim 1, wherein the message is an SCTE message.

9. A computer program product, comprising:
    a non-transitory computer-readable storage medium having computer-readable program code embodied therewith, the computer-readable program code executable by a processor to perform an operation to insert frame accurate triggers in media broadcasts, the operation comprising:
        defining a set of attributes for each of a plurality of tallies, wherein the set of attributes comprise: (i) a tally type, (ii) a source type, and (iii) an output type, wherein the tally type comprises one of an automated tally and a manual tally, wherein the manual tallies are initiated by a user and generated by a production switcher, wherein the automated tallies are generated by an automated control system and without requiring user input, wherein the set of attributes for manual tallies further comprise an input source;
        receiving an indication that a first tally, of the plurality of tallies, is active, the first tally corresponding to a frame of a media broadcast;
        upon determining that the tally type of the first tally comprises the manual tally:
            identifying the input source and the source type of the first tally; and generating an output tally based on the input source and the source type of the first tally;

upon determining that the tally type of the first tally comprises the automated tally:

identifying the source type of the first tally; and generating the output tally based on the source type of the first tally; and inserting a message in the media broadcast responsive to the output tally, wherein the message and the output tally indicate the source type of the first tally, wherein the message is inserted coincident with the frame of the media broadcast.

10. The computer program product of claim 9, wherein the source type of the manual tallies is determined by referencing an assignment logic specifying a respective source type of the active input source, wherein the source type comprises: (i) a media program source, (ii) a commercial source, (iii) an automation source, and (iv) a pass source.

11. The computer program product of claim 10, wherein output tally comprises one of: (i) a program source output tally, (ii) a commercial source output tally, (iii) an affiliate break source output tally, and (iv) a block program source output tally.

12. The computer program product of claim 11, the operation further comprising:

performing a predefined operation based on the inserted message responsive to receiving the media broadcast with the inserted message.

13. The computer program product of claim 12, wherein the predefined operation is performed by a downstream entity, the downstream entity comprises each individual entity selected from: (i) a local affiliate, (ii) a video on demand (VOD) provider, (iii) a multiple system operator (MSO), (iv) a cable provider, (v) a satellite provider, and (vi) an internet streaming service.

14. The computer program product of claim 13, wherein the downstream entity is configured to perform, in respective instances, each predefined operation selected from: (i) inserting an advertisement in a next frame of the media broadcast, (ii) resuming broadcasting of the media broadcast in the next frame of the media broadcast, and (iii) restricting broadcast of a set of frames of the media broadcast beginning with the next frame of the media broadcast.

15. The computer program product of claim 9, wherein the media broadcast is a live broadcast.

16. The computer program product of claim 9, wherein the message is an SCTE message.

17. A system, comprising:

one or more computer processors; and a memory containing a program which when executed by the one or more computer processors performs an operation to insert frame accurate triggers in media broadcasts, the operation comprising:

defining a set of attributes for each of a plurality of tallies, wherein the set of attributes comprise: (i) a tally type, (ii) a source type, and (iii) an output type, wherein the tally type comprises one of an automated tally and a manual tally, wherein the manual tallies are initiated by a user and generated by a production switcher, wherein the automated tallies are generated by an automated control system and without requiring user input, wherein the set of attributes for manual tallies further comprise an input source;

receiving an indication that a first tally, of the plurality of tallies, is active, the first tally corresponding to a frame of a media broadcast;

upon determining that the tally type of the first tally comprises the manual tally:

identifying the input source and the source type of the first tally; and generating an output tally based on the input source and the source type of the first tally;

upon determining that the tally type of the first tally comprises the automated tally:

identifying the source type of the first tally; and generating the output tally based on the source type of the first tally; and inserting a message in the media broadcast responsive to the output tally, wherein the message and the output tally indicate the source type of the first tally, wherein the message is inserted coincident with the frame of the media broadcast.

18. The system of claim 17, wherein the source type of the manual tallies is determined by referencing an assignment logic specifying a respective source type of the active input source, wherein the source type comprises one of: (i) a media program source, (ii) a commercial source, (iii) an automation source, and (iv) a pass source.

19. The system of claim 18, wherein output tally comprises one of: (i) a program source output tally, (ii) a commercial source output tally, (iii) an affiliate break source output tally, and (iv) a block program source output tally.

20. The system of claim 19, the operation further comprising:

responsive to receiving the media broadcast with the inserted message, performing a predefined operation based on the inserted message.

21. The system of claim 20, wherein the predefined operation is performed by a downstream entity, the downstream entity comprises each individual entity selected from: (i) a local affiliate, (ii) a video on demand (VOD) provider, (iii) a multiple system operator (MSO), (iv) a cable provider, (v) a satellite provider, and (vi) an internet streaming service.

22. The system of claim 21, wherein the downstream entity is configured to perform, in respective instances, each predefined operation selected from: (i) inserting an advertisement in a next frame of the media broadcast, (ii) resuming broadcasting of the media broadcast in the next frame of the media broadcast, and (iii) restricting broadcast of a set of frames of the media broadcast beginning with the next frame of the media broadcast.

23. The system of claim 17, wherein the media broadcast is a live broadcast.

24. The system of claim 17, wherein the message is an SCTE message.

* * * * *